(12) United States Patent
Bae et al.

(10) Patent No.: US 12,466,955 B2
(45) Date of Patent: Nov. 11, 2025

(54) POLYPHOSPHONATE RESIN COMPOSITION AND MOLDED ARTICLE PREPARED THEREFROM

(71) Applicant: LOTTE CHEMICAL CORPORATION, Seoul (KR)

(72) Inventors: Jin Yong Bae, Uiwang-si (KR); Jung Jae Lee, Uiwang-si (KR); Jun Ho Chi, Uiwang-si (KR); O Sung Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 532 days.

(21) Appl. No.: 18/010,052

(22) PCT Filed: Jun. 28, 2021

(86) PCT No.: PCT/KR2021/008083
§ 371 (c)(1),
(2) Date: Dec. 13, 2022

(87) PCT Pub. No.: WO2022/005129
PCT Pub. Date: Jan. 6, 2022

(65) Prior Publication Data
US 2023/0227652 A1    Jul. 20, 2023

(30) Foreign Application Priority Data
Jun. 30, 2020 (KR) .......................... 10-2020-0080463

(51) Int. Cl.
*C08K 5/526* (2006.01)
*C08L 85/02* (2006.01)
*C08G 79/04* (2006.01)

(52) U.S. Cl.
CPC ............. *C08L 85/02* (2013.01); *C08K 5/526* (2013.01); *C08G 79/04* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 2,968,670 A | * | 1/1961 | Boyer | C07F 9/145 558/95 |
| 4,282,141 A | * | 8/1981 | Minagawa | C08K 5/526 252/400.24 |
| 7,067,083 B2 | | 6/2006 | Sekharipuram et al. | |
| 2001/0053805 A1 | | 12/2001 | Srchibald et al. | |
| 2003/0096890 A1 | | 5/2003 | Archibald et al. | |
| 2005/0080172 A1 | | 4/2005 | Archibald et al. | |
| 2007/0203269 A1 | | 8/2007 | Freitag et al. | |
| 2011/0118371 A1 | | 5/2011 | Staal et al. | |
| 2012/0121843 A1 | | 5/2012 | Lebel et al. | |
| 2015/0240080 A1 | | 8/2015 | Zhou et al. | |
| 2016/0168760 A1 | | 6/2016 | Lebel et al. | |
| 2016/0289391 A1 | | 10/2016 | Jung et al. | |

FOREIGN PATENT DOCUMENTS

| | | |
|---|---|---|
| KR | 10-2011-0031218 A1 | 3/2011 |
| KR | 10-2013-0141598 A | 12/2013 |
| KR | 10-2016-0116811 A | 10/2016 |
| KR | 10-2017-0091116 A | 8/2017 |
| WO | 01-32765 A1 | 5/2001 |
| WO | 2014-043203 A1 | 3/2014 |
| WO | 2022/005129 A1 | 1/2022 |

OTHER PUBLICATIONS

International Search Report in counterpart International Application No. PCT/KR2021/008083 dated Oct. 5, 2021, pp. 1-6.

* cited by examiner

*Primary Examiner* — David J Buttner
(74) *Attorney, Agent, or Firm* — Additon, Pendleton & Witherspoon, P.A.

(57) ABSTRACT

A polyphosphonate resin composition of the present invention comprises: about 100 parts by weight of a polyphosphonate resin containing a repeating unit represented by chemical formula 1; and about 0.01 to about 0.05 parts by weight of a phosphite compound containing at least one of diphenyl hydrogen phosphite and a phosphite compound represented by chemical formula 2. The polyphosphonate resin composition has excellent heat resistance, wet heat stability, discoloration resistance, flame retardancy, and the like.

10 Claims, No Drawings

POLYPHOSPHONATE RESIN COMPOSITION AND MOLDED ARTICLE PREPARED THEREFROM

CROSS-REFERENCE TO RELATED APPLICATIONS

This application claims priority to and the benefit of International Application No. PCT/KR2021/008083, filed Jun. 28, 2021, which published as WO 2022/005129 on Jan. 6, 2022, and Korean Patent Application No. 10-2020-0080463, filed in the Korean Intellectual Property Office on Jun. 30, 2020, the entire disclosure of each of which is incorporated herein by reference.

TECHNICAL FIELD

The present invention relates to a polyphosphonate resin composition and a molded article prepared therefrom. More particularly, the present invention relates to a polyphosphonate resin composition that exhibits good properties in terms of heat resistance, humid heat stability, discoloration resistance, flame retardancy, and the like, and a molded article prepared therefrom.

BACKGROUND ART

Generally, a flame retardant is added to and blended with a thermoplastic resin to improve flame retardancy of the thermoplastic resin. Among flame retardants, since use of halogen flame retardants is limited due to environmental problems and the like, despite excellent flame retardancy, phosphorus flame retardants are mainly used in the art. Although phosphate, phosphine oxide, phosphite, and phosphonate can be used as the phosphorus flame retardants, low-molecular-weight phosphorus compounds are generally used, thereby causing loss of the thermoplastic resin or deterioration in appearance of products formed thereof through volatilization upon processing of the thermoplastic resin at high temperature.

In order to solve such problems of the mixture of the thermoplastic resin and the phosphorus flame retardant, a high molecular weight phosphorus polymer (polyphosphonate resin and the like) can be used as a base resin. However, the high molecular weight phosphorus polymer causes reduction in molecular weight and discoloration under high temperature and/or high humidity conditions.

Therefore, there is a need for a polyphosphonate resin composition having good properties in terms of heat resistance, humid heat stability, discoloration resistance, flame retardancy, and balance therebetween.

The background technique of the present invention is disclosed in Korean Patent Laid-open Publication No. 10-2017-0091116 and the like.

DISCLOSURE

Technical Problem

It is one aspect of the present invention to provide a polyphosphonate resin composition that exhibits good properties in terms of heat resistance, humid heat stability, discoloration resistance, flame retardancy, and the like.

It is another aspect of the present invention to provide a molded article prepared from the polyphosphonate resin composition.

The above and other aspects of the present invention can be achieved by the present invention described below.

Technical Solution

1. One aspect of the present invention relates to a polyphosphonate resin composition. The polyphosphonate resin composition comprises: about 100 parts by weight of a polyphosphonate resin including a repeat unit represented by Formula 1; and about 0.01 to about 0.05 parts by weight of a phosphite compound including at least one selected from among diphenyl hydrogen phosphite and a phosphite compound represented by Formula 2;

[Formula 1]

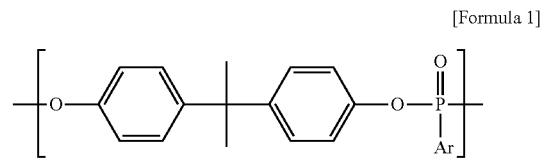

In Formula 1, Ar is a substituted or unsubstituted $C_6$ to $C_{20}$ aryl group;

[Formula 2]

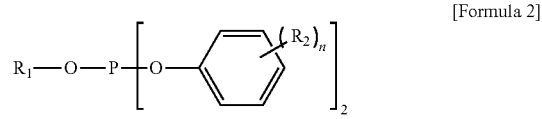

In Formula 2, $R_1$ is a linear or branched $C_4$ to $C_{16}$ alkyl group, $R_2$ is a $C_1$ to $C_{10}$ alkyl group, and n is an integer of 0 to 5.

2. In embodiment 1, the polyphosphonate resin may comprise a polymer of bisphenol-A and diarylaryl phosphonate.

3. In embodiment 1 or 2, the polyphosphonate resin may comprise about 90 mol % or more of the repeat unit represented by Formula 1 based on 100 mol % of all repeat units.

4. In embodiments 1 to 3, the polyphosphonate resin may have a weight average molecular weight (Mw) of about 20,000 to about 100,000 g/mol, as measured by gel permeation chromatography (GPC).

5. In embodiments 1 to 4, the polyphosphonate resin composition may have a weight average molecular weight difference (ΔMw) of about 1,000 g/mol or less, as calculated by Equation 1:

Weight average molecular weight difference (ΔMw)
$= Mw_0 - Mw_1$  [Equation 1]

where $Mw_0$ is a weight average molecular weight (Mw) of the resin composition, as measured by gel permeation chromatography (GPC), and $Mw_1$ is a weight average molecular weight (Mw) of the resin composition, as measured on a specimen by GPC, in which the specimen is prepared in pellet form through re-extrusion of the resin composition once at 170° C.

6. In embodiments 1 to 5, the polyphosphonate resin composition may have a weight average molecular weight difference (ΔMw) of about 1,000 g/mol or less, as calculated by Equation 2:

Weight average molecular weight difference (ΔMw)
$= Mw_0 - Mw_2$  [Equation 2]

where $Mw_0$ is a weight average molecular weight (Mw) of the resin composition, as measured by gel permeation chromatography (GPC), and $Mw_2$ is a weight average molecular weight (Mw) of the resin composition, as measured on a specimen by GPC, in which the specimen is prepared in pellet form by re-extrusion of the resin composition once at 170° C. and left under conditions of 80° C. and 90% RH (relative humidity) for 16 hours.

7. In embodiments 1 to 6, the polyphosphonate resin composition may have a yellowness index difference (ΔYI) of about 5 or less, as calculated by Equation 3:

Yellowness index difference $(\Delta YI)=YI_1-YI_0$ [Equation 3]

where $YI_0$ is an initial yellowness index (YI) of a 2.5 mm thick specimen, as measured in accordance with ASTM D1925, in which the specimen is prepared through injection-molding of the resin composition at an injection barrel temperature of 200° C. without leaving the resin composition in a cylinder, and $YI_1$ is an initial yellowness index (YI) of a 2.5 mm thick specimen, as measured in accordance with ASTM D1925, in which the specimen is prepared by leaving the resin composition in the cylinder for 5 minutes and injection-molding the resin composition at an injection barrel temperature of 200° C.

8. In embodiments 1 to 7, the polyphosphonate resin composition may have a flame retardancy of V-0 or higher, as measured on a 0.7 mm thick specimen in accordance with a UL-94 vertical test method.

9. In embodiments 1 to 8, the polyphosphonate resin composition may have a notched Izod impact strength of about 1 to about 10 kgf·cm/cm, as measured on a ⅛" thick specimen in accordance with ASTM D256.

10. Another aspect of the present invention relates to a molded article. The molded article is prepared from the polyphosphonate resin composition according to any one of embodiments 1 to 9.

Advantageous Effects

The present invention provides a polyphosphonate resin composition that has good properties in heat resistance, humid heat stability, discoloration resistance, flame retardancy, and the like, and a molded article prepared therefrom.

BEST MODE

Hereinafter, embodiments of the present invention will be described in detail.

A polyphosphonate resin composition according to the present invention comprises: (A) a polyphosphonate resin; and (B) a phosphite compound.

As used herein to represent a specific numerical range, the expression "a to b" means "≥a and ≤b".

(A) Polyphosphonate Resin

According to the present invention, the polyphosphonate resin is used as a base resin to improve heat resistance, humid heat stability, discoloration resistance, flame retardancy and the like of the resin composition together with a specific phosphite compound. The polyphosphonate resin comprises a repeat unit represented by Formula 1.

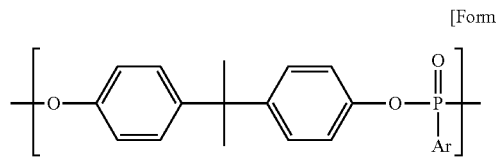

[Formula 1]

where Ar is a substituted or unsubstituted $C_6$ to $C_{20}$ aryl group.

In some embodiments, the polyphosphonate resin may be prepared by reacting an aromatic diol compound, such as bisphenol-A and the like, with a diarylaryl phosphonate. Reaction may be carried out by a polyphosphonate polymerization method known in the art.

In some embodiments, the aromatic diol compound may comprise bisphenol-A(2,2-bis(4-hydroxyphenyl)propane), 4,4'-biphenol, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like. For example, the aromatic diol compound may be 2,2-bis(4-hydroxyphenyl)propane, 2,2-bis(3,5-dichloro-4-hydroxyphenyl)propane, 2,2-bis(3-methyl-4-hydroxyphenyl)propane, or 1,1-bis(4-hydroxyphenyl)cyclohexane. Specifically, the aromatic diol compound may be 2,2-bis(4-hydroxyphenyl)propane, which is also referred to as bisphenol-A.

In some embodiments, the diarylaryl phosphonate may comprise diphenyl phenyl phosphonate, diphenyl tolyl phosphonate, diphenyl naphthyl phosphonate, and the like.

In some embodiments, the polyphosphonate resin may comprise about 90 mol % or more, for example, about 95 to about 100 mol %, of the repeat unit represented by Formula 1, based on 100 mol % of all repeat units. In other words, the polyphosphonate resin may be prepared by reacting about 90 mol % or more, for example, about 95 to about 100 mol %, of bisphenol-A and the balance of at least one of other aromatic diol compounds, as the aromatic diol compounds, with the diarylaryl phosphonate. Within this range, the polyphosphonate resin can be used as the base resin and can improve heat resistance, chemical resistance, scratch resistance, and the like of the resin composition.

In some embodiments, the polyphosphonate resin may have a weight average molecular weight (Mw) of about 20,000 to about 100,000 g/mol, for example, about 20,000 to about 70,000 g/mol, as measured by gel permeation chromatography (GPC). Within this range, the polyphosphonate resin can be used as the base resin and can improve heat resistance, flame retardancy, and the like of the resin composition.

(B) Phosphite Compound

According to the present invention, the phosphite compound serves to improve heat resistance, humid heat stability, discoloration resistance, flame retardancy and the like of the polyphosphonate resin composition without deterioration in mechanical properties thereof, and may comprise diphenyl hydrogen phosphite and/or a phosphite compound represented by Formula 2.

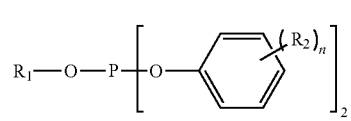

[Formula 2]

where $R_1$ is a linear or branched $C_4$ to $C_{16}$ alkyl group, $R_2$ is a $C_1$ to $C_{10}$ alkyl group, and n is an integer of 0 to 5.

In some embodiments, the phosphite compound may comprise diphenyl hydrogen phosphite, diphenyl methyl phosphite, diphenyl ethyl phosphite, diphenyl iso-octyl phosphite, diphenyl t-butyl phosphite, diphenyl dodecyl phosphite, and combinations thereof.

In some embodiments, the phosphite compound may be present in an amount of about 0.01 to about 0.05 parts by weight, for example, about 0.01 to about 0.04 parts by weight, relative to about 100 parts by weight of the polyphosphonate resin. If the content of the phosphite compound is less than about 0.01 parts by weight relative to about 100 parts by weight of the polyphosphonate resin, the polyphosphonate resin composition can suffer from deterioration in heat resistance, discoloration resistance, and the like, and if the content of the phosphite compound exceeds about 0.05 parts by weight, the polyphosphonate resin composition can suffer from deterioration in humid heat stability, heat discoloration resistance, and the like.

According to one embodiment of the invention, the polyphosphonate resin composition may further comprise additives used in typical thermoplastic resin composition. The additives may comprise, for example, impact modifiers, inorganic fillers, antioxidants, anti-dripping agents, lubricants, release agents, nucleating agents, antistatic agents, stabilizers, pigments, dyes, and mixtures thereof, without being limited thereto. The additives may be present in an amount of about 0.001 to about 40 parts by weight, for example, about 0.01 to about 10 parts by weight, relative to about 100 parts by weight of the polyphosphonate resin.

According to one embodiment of the invention, the polyphosphonate resin composition may be blended with a typical thermoplastic resin to improve heat resistance, heat discoloration resistance and flame retardancy of a thermoplastic resin. The thermoplastic resin may comprise, for example, a polycarbonate resin, a polyester resin, a polyamide resin, and a rubber-modified aromatic vinyl copolymer resin, without being limited thereto.

The polyphosphonate resin composition according to one embodiment of the invention may be prepared in pellet form by mixing the above components, followed by melt extrusion of the mixture using a typical twin-screw extruder at about 150 to about 250° C., for example, about 160 to about 240° C.

In some embodiments, the polyphosphonate resin composition may have heat resistance corresponding to a weight average molecular weight difference ($\Delta Mw$) of about 1,000 g/mol or less, for example, about 80 to about 980 g/mol, as calculated by Equation 1.

Weight average molecular weight difference ($\Delta Mw$)
$= Mw_0 - Mw_1$ [Equation 1]

where $Mw_0$ is a weight average molecular weight (Mw) of the resin composition, as measured by gel permeation chromatography (GPC), and $Mw_1$ is a weight average molecular weight (Mw) of the resin composition, as measured on a specimen by GPC, in which the specimen is prepared in pellet form through re-extrusion of the resin composition once at 170° C.

In some embodiments, the polyphosphonate resin composition may have humid heat resistance corresponding to a weight average molecular weight difference ($\Delta Mw$) of about 1,000 g/mol or less, for example, about 80 to about 980 g/mol, as calculated by Equation 2.

Weight average molecular weight difference ($\Delta Mw$)
$= Mw_0 - Mw_2$ [Equation 2]

where $Mw_0$ is a weight average molecular weight (Mw) of the resin composition, as measured by gel permeation chromatography (GPC), and $Mw_2$ is a weight average molecular weight (Mw) of the resin composition, as measured on a specimen by GPC, in which the specimen is prepared in pellet form by re-extrusion of the resin composition once at 170° C. and left under conditions of 80° C. and 90% RH for 16 hours.

In some embodiments, the polyphosphonate resin composition may have a yellowness index difference ($\Delta YI$) of about 5 or less, for example, about 1 to about 4.8, as calculated by Equation 3.

Yellowness index difference ($\Delta YI$) = $YI_1 - YI_0$ [Equation 3]

where $YI_0$ is an initial yellowness index (YI) of a 2.5 mm thick specimen, as measured in accordance with ASTM D1925, in which the specimen is prepared through injection-molding of the resin composition at an injection barrel temperature of 200° C. without leaving the resin composition in a cylinder, and $YI_1$ is an initial yellowness index (YI) of a 2.5 mm thick specimen, as measured in accordance with ASTM D1925, in which the specimen is prepared by leaving the resin composition in the cylinder for 5 minutes and injection-molding the resin composition at an injection barrel temperature of 200° C.

In some embodiments, the polyphosphonate resin composition may have a flame retardancy of V-0 or higher, as measured on a 0.7 mm thick specimen in accordance with a UL-94 vertical test method.

In some embodiments, the polyphosphonate resin composition may have a notched Izod impact strength of about 1 to about 10 kgf·cm/cm, for example, about 3 to about 8 kgf·cm/cm, as measured on a ⅛" thick specimen in accordance with ASTM D256.

A molded article according to the present invention is prepared from the polyphosphonate resin composition set forth above. The polyphosphonate resin composition may be prepared in pellet form. The prepared pellets may be produced into various molded articles (products) by various molding methods, such as injection molding, extrusion, vacuum molding, and casting. These molding methods are well known to those skilled in the art. The molded articles according to the present invention have good properties in terms of heat resistance (reduction in weight average molecular weight decrease before and after extrusion), humid heat stability, discoloration resistance, flame retardancy, and property balance therebetween, and are useful as interior/exterior materials of electric/electronic products.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Base Resin (A1) A bisphenol-A polyphosphonate resin prepared through reaction of bisphenol-A and diphenyl phenyl phosphate and having a weight average molecular weight of 25,200 g/mol was used.

(A2) A bisphenol-A polyphosphonate resin prepared through reaction of bisphenol-A and diphenyl phenyl phosphate and having a weight average molecular weight of 10,600 g/mol was used.

(A3) A bisphenol-A polyphosphonate resin prepared through reaction of bisphenol-A and diphenyl phenyl phosphate and having a weight average molecular weight of 19,800 g/mol was used.

(A4) A bisphenol-A polycarbonate resin having a weight average molecular weight (Mw) of 25,000 g/mol was used.

(B) Phosphite Compound (B1) Diphenyl hydrogen phosphite (Manufacturer: Sigma-Aldrich) was used.

(B2) Diphenyl isooctyl phosphite (Manufacturer: Sigma-Aldrich) was used.

(B3) Tris(2,4-di-tert-butylphenyl)phosphite (Manufacturer: Sigma-Aldrich) was used.

(C) Bisphenol-A diphosphate (Manufacturer: Daihachi, Product Name: DVP506) was used.

Examples 1 to 6 and Comparative Examples 1 to 8

The above components were mixed in amounts as listed in Table 1 and 2 and subjected to extrusion under conditions of 170° C., thereby preparing pellets. Extrusion was performed using a twin-screw extruder (L/D=36, Φ32 mm) and the prepared pellets were dried at 80° C. for 4 hours or more and injection-molded in a 6 oz. injection molding machine (molding temperature: 200° C., mold temperature: 70° C.), thereby preparing specimens. The specimens were evaluated as to properties by the following method and results are shown in Tables 1 and 2.

Property Measurement (1) Heat resistance (unit: g/mol): Weight average molecular weight difference (ΔMw) was calculated according to Equation 1.

$$\text{Weight average molecular weight difference } (\Delta Mw) = Mw_0 - Mw_1 \quad [\text{Equation 1}]$$

where $Mw_0$ is a weight average molecular weight (Mw) of the resin composition, as measured by gel permeation chromatography (GPC), and $Mw_1$ is a weight average molecular weight (Mw) of the resin composition, as measured on a specimen by GPC, in which the specimen is prepared in pellet form through re-extrusion of the resin composition once at 170° C.

(2) Humid heat stability (unit: g/mol): Weight average molecular weight difference (ΔMw) was calculated according to Equation 2.

$$\text{Weight average molecular weight difference } (\Delta Mw) = Mw_0 - Mw_2 \quad [\text{Equation 2}]$$

where $Mw_0$ is a weight average molecular weight (Mw) of the resin composition, as measured by gel permeation chromatography (GPC), and $Mw_2$ is a weight average molecular weight (Mw) of the resin composition, as measured on a specimen by GPC, in which the specimen is prepared in pellet form by re-extrusion of the resin composition once at 170° C. and left under conditions of 80° C. and 90% RH for 16 hours.

(3) Discoloration resistance: Yellowness index difference (ΔYI) was calculated according to Equation 3.

$$\text{Yellowness index difference } (\Delta YI) = YI_1 - YI_0 \quad [\text{Equation 3}]$$

where $YI_0$ is an initial yellowness index (YI) of a 2.5 mm thick specimen, as measured in accordance with ASTM D1925, in which the specimen is prepared through injection-molding of the resin composition at an injection barrel temperature of 200° C. without leaving the resin composition in a cylinder, and $YI_1$ is an initial yellowness index (YI) of a 2.5 mm thick specimen, as measured in accordance with ASTM D1925, in which the specimen is prepared by leaving the resin composition in the cylinder for 5 minutes and injection-molding the resin composition at an injection barrel temperature of 200° C.

(4) Flame retardancy: Flame retardancy was measured on a 0.7 mm thick specimen in accordance with UL-94.

(5) Impact resistance (unit: kgf·cm/cm): Notched Izod impact strength was measured on a ⅛" thick specimen in accordance with ASTM D256.

TABLE 1

| | Example | | | | | |
|---|---|---|---|---|---|---|
| | 1 | 2 | 3 | 4 | 5 | 6 |
| (A1) (parts by weight) | 100 | 100 | 100 | 100 | 100 | 100 |
| (A2) (parts by weight) | — | — | — | — | — | — |
| (A3) (parts by weight) | — | — | — | — | — | — |
| (A4) (parts by weight) | — | — | — | — | — | — |
| (B1) (parts by weight) | 0.01 | 0.02 | 0.03 | — | — | — |
| (B2) (parts by weight) | — | — | — | 0.01 | 0.02 | 0.03 |
| (B3) (parts by weight) | — | — | — | — | — | — |
| (C) (parts by weight) | — | — | — | — | — | — |
| Heat resistance (ΔMw) | 600 | 600 | 800 | 700 | 700 | 700 |
| Humid heat stability (ΔMw) | 500 | 400 | 400 | 500 | 600 | 400 |
| Discoloration resistance (ΔYI) | 4.2 | 3.9 | 4.6 | 4.5 | 4.2 | 4.1 |
| Flame retardancy | V-0 | V-0 | V-0 | V-0 | V-0 | V-0 |
| Notched Izod impact strength | 3.3 | 3.4 | 3.4 | 3.5 | 3.5 | 3.5 |

TABLE 2

| | Comparative Example | | | | | | | |
|---|---|---|---|---|---|---|---|---|
| | 1 | 2 | 3 | 4 | 5 | 6 | 7 | 8 |
| (A1) (parts by weight) | — | — | 100 | 100 | 100 | 100 | 100 | — |
| (A2) (parts by weight) | 100 | — | — | — | — | — | — | — |
| (A3) (parts by weight) | — | 100 | — | — | — | — | — | — |

TABLE 2-continued

| | Comparative Example | | | | | | | |
|---|---|---|---|---|---|---|---|---|
| | 1 | 2 | 3 | 4 | 5 | 6 | 7 | 8 |
| (A4) (parts by weight) | — | — | — | — | — | — | — | 100 |
| (B1) (parts by weight) | 0.02 | 0.02 | 0.005 | 0.06 | — | — | — | — |
| (B2) (parts by weight) | — | — | — | — | 0.005 | 0.06 | — | — |
| (B3) (parts by weight) | — | — | — | — | — | — | 0.02 | — |
| (C) (parts by weight) | — | — | — | — | — | — | — | 0.02 |
| Heat resistance (ΔMw) | 2,400 | 2,500 | 2,000 | 500 | 1,800 | 500 | 900 | 1,700 |
| Humid heat stability (ΔMw) | N/A | N/A | 0.4 | 1.8 | 0.5 | 1.9 | 1.4 | 1.5 |
| Discoloration resistance (ΔYI) | N/A | N/A | 5.8 | 5.6 | 4.7 | 4.2 | 4.3 | 4.5 |
| Flame retardancy | N/A | N/A | V-0 | V-0 | V-0 | V-0 | V-0 | V-2 |
| Notched Izod impact strength | N/A | N/A | 3.5 | 3.4 | 3.4 | 3.6 | 3.4 | 3.1 |

(N/A: Data not obtained due to failure of injection molding of specimen)

From the result, it could be seen that the polyphosphonate resin compositions according to the present invention exhibited good properties in terms of heat resistance (difference in weight average molecular weight between before and after extrusion, high temperature heat stability), humid heat stability, discoloration resistance (difference in yellowness index between before and after residence at high temperature, heat discoloration resistance), flame retardancy, and balance therebetween.

Conversely, it could be seen that the polyphosphonate resin compositions of Comparative Examples 1 and 2 prepared using the polyphosphonate resins (A2) and (A3) instead of the polyphosphonate resin of the present invention suffered from deterioration in heat resistance and did not allow injection molding. It could be seen that the polyphosphonate resin composition (Comparative Example 3) prepared using an insufficient amount of the phosphite compound (B1) suffered from deterioration in heat resistance, discoloration resistance, and the like; the polyphosphonate resin composition (Comparative Example 4) prepared using an excess of the phosphite compound (B1) suffered from deterioration in humid heat stability, discoloration resistance, and the like; the polyphosphonate resin composition (Comparative Example 5) prepared using an insufficient amount of the phosphite compound (B2) suffered from deterioration in heat resistance and the like; and the polyphosphonate resin composition (Comparative Example 6) prepared using an excess of the phosphite compound (B2) suffered from deterioration in humid heat stability and the like. In addition, it could be seen that the polyphosphonate resin composition (Comparative Example 7) prepared using the compound (B3) instead of the phosphite resin of the present invention suffered from deterioration in humid heat stability and the like; and the resin composition (Comparative Example 8) prepared using the polycarbonate resin instead of the polyphosphonate resin as the base resin and the phosphate compound (D) instead of the phosphite compound of the present invention suffered from deterioration in heat resistance, humid heat stability, flame retardancy, and the like.

Although some exemplary embodiments have been described herein, it should be understood by those skilled in the art that these embodiments are given by way of illustration only, and that various modifications, variations and alterations can be made without departing from the spirit and scope of the invention. Therefore, the embodiments should not be construed as limiting the scope of the invention, but should be construed as illustrating the invention. The scope of the present invention should be interpreted according to the appended claims as covering all modifications or variations derived from the appended claims and equivalents thereto.

The invention claimed is:

1. A polyphosphonate resin composition comprising:
    about 100 parts by weight of a polyphosphonate resin comprising a repeat unit represented by Formula 1; and
    about 0.01 to about 0.05 parts by weight of a phosphite compound comprising at least one selected from diphenyl hydrogen phosphite and a phosphite compound represented by Formula 2;

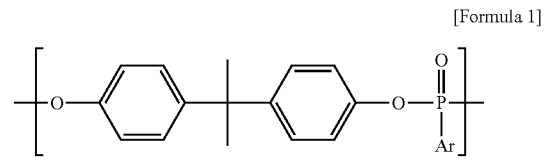

[Formula 1]

where Ar is a substituted or unsubstituted $C_6$ to $C_{20}$ aryl group;

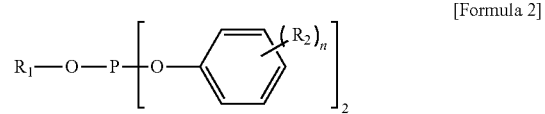

[Formula 2]

where $R_1$ is a linear or branched $C_4$ to $C_{16}$ alkyl group, $R_2$ is a $C_1$ to $C_{10}$ alkyl group, and n is an integer of 0 to 5.

2. The polyphosphonate resin composition according to claim 1, wherein the polyphosphonate resin comprises a polymer of bisphenol-A and diarylaryl phosphonate.

3. The polyphosphonate resin composition according to claim 1, wherein the polyphosphonate resin comprises about 90 mol % or more of the repeat unit represented by Formula 1 based on 100 mol % of all repeat units.

4. The polyphosphonate resin composition according to claim 1, wherein the polyphosphonate resin has a weight average molecular weight (Mw) of about 20,000 to about 100,000 g/mol, as measured by gel permeation chromatography (GPC).

5. The polyphosphonate resin composition according to claim 1, wherein the polyphosphonate resin composition has a weight average molecular weight difference (ΔMw) of about 1,000 g/mol or less, as calculated by Equation 1:

Weight average molecular weight difference (ΔMw)
$= Mw_0 - Mw_1$  [Equation 1]

where $Mw_0$ is a weight average molecular weight (Mw) of the resin composition, as measured by gel permeation chromatography (GPC), and $Mw_1$ is a weight average molecular weight (Mw) of the resin composition, as measured on a specimen by GPC, in which the specimen is prepared in pellet form through re-extrusion of the resin composition once at 170° C.

6. The polyphosphonate resin composition according to claim 1, wherein the polyphosphonate resin composition has a weight average molecular weight difference (ΔMw) of about 1,000 g/mol or less, as calculated by Equation 2:

Weight average molecular weight difference (Δ$Mw$)
=$Mw_0$–$Mw_2$                [Equation 2]

where $Mw_0$ is a weight average molecular weight (Mw) of the resin composition, as measured by gel permeation chromatography (GPC), and $Mw_2$ is a weight average molecular weight (Mw) of the resin composition, as measured on a specimen by GPC, in which the specimen is prepared in pellet form by re-extrusion of the resin composition once at 170° C. and left under conditions of 80° C. and 90% RH for 16 hours.

7. The polyphosphonate resin composition according to claim 1, wherein the polyphosphonate resin composition has a yellowness index difference (ΔYI) of about 5 or less, as calculated by Equation 3:

Yellowness index difference (Δ$YI$)=$YI_1$–$YI_0$                [Equation 3]

where $YI_0$ is an initial yellowness index (YI) of a 2.5 mm thick specimen, as measured in accordance with ASTM D1925, in which the specimen is prepared through injection-molding of the resin composition at an injection barrel temperature of 200° C. without leaving the resin composition in a cylinder, and $YI_1$ is an initial yellowness index (YI) of a 2.5 mm thick specimen, as measured in accordance with ASTM D1925, in which the specimen is prepared by leaving the resin composition in the cylinder for 5 minutes and injection-molding the resin composition at an injection barrel temperature of 200° C.

8. The polyphosphonate resin composition according to claim 1, wherein the polyphosphonate resin composition has a flame retardancy of V-0 or higher, as measured on a 0.7 mm thick specimen in accordance with a UL-94 vertical test method.

9. The polyphosphonate resin composition according to claim 1, wherein the polyphosphonate resin composition has a notched Izod impact strength of about 1 to about 10 kgf·cm/cm, as measured on a ⅛" thick specimen in accordance with ASTM D256.

10. A molded article prepared from the polyphosphonate resin composition according to claim 1.

* * * * *